US008202926B2

(12) United States Patent
Pitt et al.

(10) Patent No.: US 8,202,926 B2
(45) Date of Patent: Jun. 19, 2012

(54) COATING COMPOSITION CONTAINING A DISPERSANT

(75) Inventors: Alan R. Pitt, Sandridge (GB); Trevor J. Wear, Ely (GB); John H. Hone, Chalfont St. Peter (GB); Andrew M. Howe, Cambridge (GB); Ian M. Newington, High Wycombe (GB)

(73) Assignee: Eastman Kodak Company, Rochester, NY (US)

( * ) Notice: Subject to any disclaimer, the term of this patent is extended or adjusted under 35 U.S.C. 154(b) by 680 days.

(21) Appl. No.: 12/097,770

(22) PCT Filed: Dec. 19, 2006

(86) PCT No.: PCT/GB2006/004752
§ 371 (c)(1),
(2), (4) Date: Jun. 17, 2008

(87) PCT Pub. No.: WO2007/071960
PCT Pub. Date: Jun. 28, 2007

(65) Prior Publication Data
US 2008/0317960 A1      Dec. 25, 2008

(30) Foreign Application Priority Data

Dec. 22, 2005 (GB) ................................. 0526231.6

(51) Int. Cl.
*C08K 3/10* (2006.01)
(52) U.S. Cl. .................. 524/406; 427/372.2; 427/385.5; 524/413; 524/430; 524/431; 524/547; 524/548; 524/555
(58) Field of Classification Search .................. 524/413, 524/430, 431, 492, 406, 547, 548, 555; 427/372.2, 427/385.5
See application file for complete search history.

(56) References Cited

U.S. PATENT DOCUMENTS

| 3,346,334 A | 10/1967 | Weldes et al. |
| 3,360,954 A | 12/1971 | Yates et al. |
| 3,714,064 A | 1/1973 | Vossos |
| 4,839,414 A | 6/1989 | Bederke et al. |
| 6,495,618 B1 | 12/2002 | Ma |
| 6,667,142 B2 * | 12/2003 | Dorr et al. ..................... 430/157 |
| 2004/0170657 A1 | 9/2004 | Morvan |
| 2008/0090012 A1 | 4/2008 | Pitt et al. |
| 2008/0145546 A1 | 6/2008 | Pitt et al. |

FOREIGN PATENT DOCUMENTS

| EP | 0 850 879 | 7/1998 |
| EP | 0 879 860 | 11/1998 |
| JP | 61-118130 | 6/1986 |
| JP | 01-156594 | 6/1989 |
| JP | 04-272-888 | 9/1992 |
| JP | 05-064735 | 3/1993 |
| JP | 2002-095949 | 4/2002 |
| WO | WO 2006/067453 | 6/2006 |
| WO | WO 2006/067457 | 6/2006 |

* cited by examiner

*Primary Examiner* — David W Wu
*Assistant Examiner* — Marie Reddick
(74) *Attorney, Agent, or Firm* — Arthur E. Kluegel; Andrew J. Anderson

(57) ABSTRACT

The invention provides a dispersant for an aqueous dispersion of negatively charged or chargeable solid particulates which comprises a compound having an anchoring moiety linked to a polymeric hydrophilic moiety, the anchoring moiety containing at least one basic group and having an overall basicity and the polymeric moiety having a lower affinity for the particulate surface than the anchoring moiety. The invention also provides a coating composition containing the dispersant, an inkjet recording element containing the dispersant and methods of coating or reducing viscosity using the dispersant.

19 Claims, 1 Drawing Sheet

COATING COMPOSITION CONTAINING A DISPERSANT

FIELD OF THE INVENTION

The invention relates to a dispersant for an aqueous solid dispersion or composition therefrom, and in particular a dispersion of negatively charged or chargeable solid particulates, which can reduce the viscosity and/or the tendency to form a gel or a yield stress material, without increasing the pH of the system to above about 9. The solid particulate dispersion may be used, for example, as a component of a coating material, an inkjet recording paper or film, a chemical-mechanical polishing/abrasive material, a ceramic, a cement, a paint, a catalyst system, a refractory material, a surface-frictionising formulation, a filler or any product that incorporates nanoparticulate materials.

BACKGROUND OF THE INVENTION

Manufacturing formulations involving aqueous solid dispersions often require to be processed at a high concentration of solids for one or more of the following reasons: to improve the costs/efficiency of transportation, to increase laydown or to reduce the drying load, as the removal of water is wasteful and expensive. The formulations also need to be stable over a wide range of shear, which extends from low to high shear rates. After mixing, aqueous dispersions of particulates, especially those containing high concentrations of solid, tend to form a 'yield stress material' as the shear stress is relaxed, the viscosities climbing dramatically with the decreasing shear such that, for example, gels may be deposited in zones of reduced shear. The high viscosity of the dispersions at low shear affects their dispersability and flowability, making the systems difficult to stir, pump, transport, coat or pour. Moreover their tendency to form a yield stress material or to gel in regions of low flow is often more of a problem, as gelation is often irreversible and consequently totally unacceptable for manufacturing processes that rely on systems to flow.

It is known in the art that an inorganic, organic or polymeric form of a base may be added to preparations of silica sols to minimize particle growth and stabilize the particulate dispersion. Thus U.S. Pat. No. 3,346,334 describes the use of a base, such as sodium hydroxide or ammonium hydroxide, to form relatively stable silica sols of particle size 2-3 nm and U.S. Pat. No. 3,714,064 discloses the use of an alkaline medium of pH 9-11 to prepare silica sols with particles less than 5 nm in size containing up to 25% silica. Steric stabilization has also been used in the case of very small particles to supplement ionic stabilization.

JP 54043937 and JP 54043938 describe a dispersant combination for silica sol coating compositions based on polyethylene glycol (t-dodecylthio)- or (t-tridecylthio)ethyl ether or polyethylene glycol sorbitan monoalkanoate, maleic acid or vinylpyrrolidone resin emulsion with, respectively, an alkaline solution of alginic acid or a solubilized styrene-maleic acid copolymer. These combinations are reported to provide excellent storability and pigment dispersibility under the conditions stated.

JP 61118130 discloses aqueous dispersants for fine silica particle (average diameter ~0.1 μm) suspensions based on (meth)acrylic acid or α,β-unsaturated dicarboxylic acid homopolymers or copolymers with esters, acid-amides, and/or hydrophilic or hydrophobic monomers. An example is given where the addition of acrylic acid/methylacrylate copolymer as dispersant reduces the viscosity of a silica dispersion by over an order of magnitude and stabilizes the resulting dispersion for more than 90 days.

U.S. Pat. No. 3,360,954 describes the stabilization of sols of very small particles of silica by the use of a combination of an inorganic or organic base with a water-soluble nonaromatic polyhydroxy or hydroxyether compound, for example, polyvinyl alcohol.

JP 01156594 describes dispersing agents for powdered silica-containing paper coating agents comprising polyalkylenepolyamines and/or their derivatives and JP 04272888 discloses coating compositions containing silica for recording media, which also discloses dispersing agents based on polyalkylene-polyamine.

JP 2002095949 describes dispersants for dispersions of silica particles having high concentration and low viscosity, based on polymers containing >50 mol % water-soluble nonionic monomers, such as hydroxyalkyl (meth)acrylates. The application discloses an example showing that poly-(2-hydroxyethyl acrylate) is more effective at reducing the viscosity of a particular silica dispersion than a polymer based on poly(sodium acrylate).

JP 05064735 describes dispersants for dispersing inorganic fine powders, based on polymers obtained from monomer mixtures containing $\geq$20% ethylenically α,β-unsaturated carboxylic acids or their alkali metal, ammonium, or amine salts and solvents containing 1-150 parts alkylene glycols per 100 parts polymers. The polymers may also contain polyalkylene glycol mono(meth)-acrylate as comonomer. An example is disclosed based on the use of poly(acrylic acid) sodium salt as a dispersant for a dispersion of spherical silica particles (0.2 μm diameter) in ethylene glycol.

Problem to be Solved by the Invention

There is a need for a dispersant additive for an aqueous dispersion of negatively charged or chargeable solid particulates, especially at high concentrations of solids, that can provide a low viscosity increment with increasing concentration of solids and a reduced tendency to form a gel or a yield stress material, thereby facilitating handling and processing of a resulting composition. Even though simple base and other systems can be used to reduce the viscosity of dispersions of negatively charged or chargeable solid particulates as described in the prior art above, their ability to accomplish this tends to be fairly limited or takes the systems towards extreme values of pH, which can be corrosive or too reactive, and hence unacceptable for many uses. The rheological problems defined above limit the concentration of solids that can be loaded into a dispersion formulation if the composition is to remain manageable, processable and at an acceptable midrange value of pH, i.e. from about 5 to 9. Suitable dispersants are required that enable higher concentrations of such solid particulates to be used and to enable the control of the yield stress without taking the systems towards extreme values of pH (although some yield is often beneficial in helping prevent or reduce sedimentation).

SUMMARY OF THE INVENTION

The present invention thus provides a dispersant for an aqueous composition of negatively charged or chargeable solid particulates which comprises a compound having an anchoring moiety linked to a polymeric hydrophilic moiety, the anchoring moiety containing at least one basic group and having an overall basicity and the polymeric moiety having a lower affinity for the particulate surface than the anchoring group.

There is also provided a method of reducing the viscosity and tendency to form a gel or a yield stress material of a composition of negatively charged or chargeable solid particulates whilst maintaining the pH at about 9 or below, which comprises the addition thereto of one or more dispersants as hereinbefore defined in association with an aqueous dispersing medium and optionally a binder.

In another aspect there is provided a coating composition containing negatively charged or chargeable solid particulates which comprises one or more dispersants as hereinbefore defined in association with an aqueous dispersing medium and optionally a binder.

In a further aspect there is provided a method of coating a substrate comprising the steps of
(a) providing a composition of negatively charged or chargeable solid particulates;
(b) combining the composition with one or more dispersants as hereinbefore defined in association with an aqueous dispersing medium to form a coating composition;
(c) applying the coating composition to the substrate to form a coating thereon and
(d) drying the resultant coating.

In another aspect there is provided the use of a composition for the reduction of viscosity and tendency to form a gel or a yield stress material of a composition of negatively charged or chargeable solid particulates whilst maintaining the pH at about 9 or below, and in particular for the preparation of an inkjet recording element to provide stability over a wide range of shear stress, the composition comprising one or more dispersants as hereinbefore described in association with an aqueous dispersing medium.

In yet another aspect there is provided an inkjet recording element comprising a support having thereon at least one image-receiving layer, said inkjet recording element containing a coating composition as hereinbefore defined.

ADVANTAGEOUS EFFECT OF THE INVENTION

This invention provides an efficient dispersant for an aqueous dispersion of negatively charged or chargeable solid particulates that greatly reduces the viscosity and yield stress problems associated therewith, when the dispersion is subjected to gradual relaxation of shear stress following the high shear stresses encountered during mixing. The main advantage of the dispersant of the invention is that it does not force the system to high pH, i.e. above about 9, as do other common methods of dispersing negatively charged or chargeable particulate systems, such as silica, with the addition of a simple base. The dispersant thus facilitates the manipulation of the resulting composition at lower values of pH than achievable with such bases, such as stirring, pumping, transporting, coating or pouring, even at high concentrations of solids, due to improved dispersability and flowability. The dispersant enables higher concentrations of solid particulates and enables control of the yield stress, as some yield is often beneficial in helping prevent or reduce sedimentation.

DETAILED DESCRIPTION OF THE INVENTION

Figure 1:
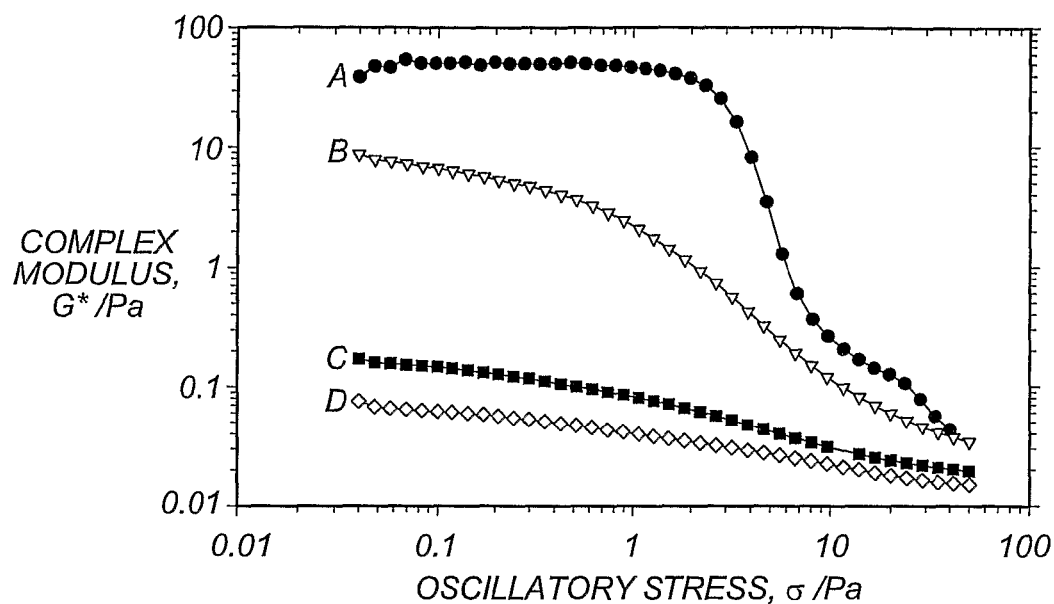
FIG. 1 shows the rheological data of an 11 wt % dispersion of Aerosil™ 200 (a commercial fumed silica) in water alone and as a function of added sodium hydroxide and the pH of the system.

Aqueous dispersions of negatively charged or chargeable solid particulates, especially at high concentrations of solids, tend to exhibit increasingly high viscosity after mixing. Eventually the rate of increase in viscosity with decreasing shear stress often becomes so high that the system becomes a yield stress material, such that it may tend to gel and not to flow.

As used herein, 'yield stress' is defined as a critical shear stress value below which a plastic or viscoplastic material behaves like a solid (i.e. will not flow). As used herein the term 'yield stress material' is defined as a material that exhibits a 'yield stress'. In many cases this will be a gel but the term is not to be construed as limited thereto, as it may, for example, be another solid form, such as a paste or 'cake'.

Once the yield stress is exceeded, a plastic material yields while a viscoplastic material flows like a liquid. This problem can manifest itself easily in any manufacturing process utilizing such a dispersion.

The objective of this invention therefore was to provide a water-soluble dispersant which would reduce these problems without taking the system towards extreme values of pH and so increase the utility of these dispersions in manufacturing processes, relative to other dispersant materials described in the prior art.

The invention accomplishes this by providing an efficient dispersant that, when added to the dispersion, reduces the intrinsic viscosity of the dispersion and reduces the tendency of the dispersion to form a gel or a yield stress material, without driving the system to a pH in excess of about 9, relative to the system in the absence of dispersant, or the system in the presence of other common dispersants and especially simple bases.

Owing to the effectiveness of the dispersants of the invention, the invention provides a method of increasing the concentration of solids in the aqueous dispersion without increasing the viscosity or tendency to form a gel or a yield stress material, relative to either a dispersion without the dispersant or with a prior art dispersant. Furthermore the invention provides a method of controlling the yield stress of the gel in the aqueous dispersion by controlling the amount of added dispersant and added solids, such that the solids loading is higher than that obtainable using prior art dispersants. The present invention thus facilitates the fluid processing and general fluid management of such dispersions in manufacturing processes, due to the improved dispersability and flowability engendered within the system.

To quantify the benefits of the dispersants of the invention it is useful to characterise the rheology of the associated aqueous dispersions or compositions resulting therefrom. The rheology of gels is intrinsically more difficult to characterize than fluids because gel structures break up under shear and there is a finite time involved in their reformation. Hence in the case of gels it is particularly useful to employ rheological measurements of an oscillatory nature, which involve only small displacements from equilibrium. In this way a complex modulus (stress over strain) or "stiffness" of the gels can be quantified. Although this approach is particularly suited to gels it can be equally well applied to fluids provided a high-quality sensitive rheometer is used, such as a Bohlin™ CS-50. A fluid version of a system will simply possess a complex modulus that is typically orders of magnitude less than when it is in a gel state.

The curves A, B, C and D in FIG. 1 are derived from rheological data of an aqueous silica dispersion in the absence and presence of a range of concentrations of sodium hydroxide base, measured with a Bohlin™ CS-50 rheometer, using an oscillation time sweep (from low to high stress), as explained in more detail hereinafter. More specifically, the rheological data are presented in terms of the complex modulus versus the oscillatory stress. Typically, a system will give a higher complex modulus at the low end of the stress range than at the high end. Also typically, when different systems are compared, they give more differential in their complex modulus at the low end of the stress range than at the high end. Therefore if a single parameter were desired to differentiate between the "stiffness" of different dispersions, it would be sensible to select a value of the complex modulus at a specific low value of oscillatory stress. Like any instrument, it is prudent to select a measurement point a little away from its working limit. In the case of the Bohlin™ CS-50 instrument used in this invention, which measures stresses down to 0.04 Pa, it is therefore prudent and convenient to select a stress of 0.1 Pa as the point of characterization. An abbreviation of $CM^{0.01}$ is used for this parameter.

Curve A represents the rheological data for a given aqueous silica dispersion (11% w/w Aerosil™200 in water) in the absence of base that forms a significant gel when at rest after shear at its natural pH of about 4.1. The curve is consistent with its weak gel structure insofar as it gives a high complex modulus (about 50 Pa) at low stress (from 0.04-3 Pa), followed by a steep reduction in complex modulus thereafter, thus showing a breakdown to a fluid-like behaviour at high oscillatory stress.

Curve B represents the corresponding rheological data for the same system, but in the presence of 15 mM sodium hydroxide. This system forms a much weaker gel when at rest after shear, as characterised by the shallowness of Curve A relative to Curve B. Clearly the base increases the fluidity of the system, but this is accompanied by a large change in the pH of the system, i.e. from 4.1 to 9.1.

Curves C and D represent the corresponding rheological data for the same system, but in the presence of 25 mM and 40 mM sodium hydroxide base respectively. These systems form fluid systems at rest after shear and are characterized by shallow curves where the complex modulus is not a steep function of the oscillatory stress. However, this achievement of fluidity is attained at the expense of a high system pH (system represented by Curve C=pH 9.6 and system represented by Curve D=pH 10.1).

As suggested above, the relative fluidity of the systems represented by Curves A, B, C and D can be differentiated and hence characterized by a single parameter, namely the value of their complex modulus at a representative low value of oscillatory stress, in this case 0.1 Pa. Taking this range of systems as an example, it can be stated that a dispersion exhibiting a high value of $CM^{0.1}$ is either a very viscous fluid or a gel, whereas a dispersion exhibiting a low value of $CM^{0.1}$ is a relatively fluid system. Hence the systems represented by Curves A, B, C and D are characterized by their complex modulus as shown in Table 1.

TABLE 1

| Dispersion (based on 11% Aerosil ™ 200 w/w in water) | $CM^{0.1}$/Pa | State | pH |
|---|---|---|---|
| Curve A (no base) | 53 | Weak gel | 4.1 |
| Curve B (15 mM NaOH) | 6.7 | Weaker gel | 9.1 |

TABLE 1-continued

| Dispersion (based on 11% Aerosil ™ 200 w/w in water) | $CM^{0.1}$/Pa | State | pH |
|---|---|---|---|
| Curve C (25 mM NaOH) | 0.15 | Fluid | 9.6 |
| Curve D (40 mM NaOH) | 0.062 | Fluid | 10.1 |

Thus an aqueous dispersion of high solids content of a representative negatively charged or chargeable solid, in this case silica, is a gel in its natural state at near neutral values of pH, for example pH about 5 to 9, i.e. ±about 2 pH units of neutral.

The primary aim for the dispersants of the invention therefore was to reduce the complex modulus values of such systems or reduce the tendency of such systems to form a gel or a yield stress material more effectively than known dispersant materials, particularly simple bases such as sodium hydroxide, without increasing the pH of the system to above about 9.

Examples of solid particulate systems that are or can be negatively charged for use in the invention are: certain oxides/hydroxides, which include metallic and non-metallic examples, ceramics and metals and negatively charged or chargeable latexes, at a pH above their isoelectric point (IEP). The present invention is particularly suited to inorganic solid particulates with an IEP below the pH of water saturated with carbon dioxide, i.e. pH<5.8, but is not limited to this condition, since the pH of a system can be raised above its IEP by the addition of a suitable base, provided the system and any associated product or process can tolerate the presence of the base. IEPs can also be manipulated to advantage by the use of different ion types in solution via specific adsorption.

Examples of oxides that possess an IEP pH<5.8 are, for example, those of silicon, $SiO_2$ (silica), titanium $TiO_2$ (anatase), tellurium $TeO_2$, molybdenum, $H_2MoO_4$, tin $SnO_2$ and zirconium $ZrO_2$ (zirconia) and the use of silica is preferred. The oxide of cobalt, $CO_3O_4$, can also possess an IEP<5.8 depending on how it is prepared. Metals that possess an IEP pH<5.8 are, for example: Mo, Pt, Te and Sn.

The dispersant for use in the invention comprises a compound having an anchoring moiety linked to a polymeric hydrophilic moiety, the anchoring moiety containing at least one basic group and having an overall basicity and the polymeric moiety having a lower affinity for the surface of the negatively charged or chargeable solid particulates than the anchoring group.

The basic group is preferably selected from an unsubstituted or substituted amine, nitrogen-containing heterocycle, which may contain one or more other heterocyclic atoms selected from nitrogen, oxygen and sulfur, or the hydroxide of a quaternary ammonium or pyridinium salt. By way of example only, the basic group may be an unsubstituted or substituted amine, dimethyl-amine, diethylamine, piperidine, piperazine, thiomorpholine, morpholine, benzimidazole, benzopyrrolidine, pyridine or pyrazole group. Thus, for example, a diethylamine group may be substituted with, for example one or more hydroxy or halogen or aryl groups, and a heterocyclic compound may be substituted with, for example, an alkyl, aralkyl or other heterocyclic group, such as, for example a pyridine group. More preferably the basic group is a N,N-dimethylamino group or most preferably an unsubstituted amino group.

The polymeric hydrophilic moiety is preferably selected, for example, from polyacrylamide, polymethacrylamide, poly-N-methylacrylamide or poly-N-methylmethacrylamide or a mixture thereof, or a mixture containing poly-N,N-dimethylacrylamide, provided it is present as a minority component. More preferably the polymer is polyacrylamide or polymethacrylamide, most preferably polyacrylamide.

The polymeric moiety may contain hydrophobic monomers, provided that it remains hydrophilic in character overall and provided that it contains less than 25% hydrophobic groups and preferably less than 12% hydrophobic groups.

In accordance with a preferred embodiment of the invention the dispersant of the invention has the formula (I):—

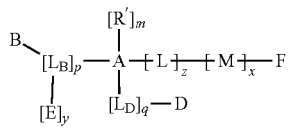

wherein

A is carbon or nitrogen;

R' is hydrogen or an unsubstituted or substituted alkyl, aryl or heterocyclic group and m is 1 when A is carbon and m is 0 when A is nitrogen;

B is a basic group;

each D and E is independently hydrogen, unsubstituted or substituted alkyl or a basic group; or an acid group or an ester or amide thereof and y is 0 or 1;

L, $L_B$ and $L_D$ are linking groups, which are the same or different, and z, p and q are each independently 0 or 1;

B, $L_B$, D, $L_D$ and L may combine with A to form more one or more rings which may include one or more further heteroatoms selected from nitrogen, oxygen and sulfur;

each M is a monomer unit, which may be the same or different, comprising an unsubstituted or substituted acrylamide or methacrylamide, and x is 10-200; and F is hydrogen or a substituent;

with the proviso that the number of basic groups is greater than the number of any acid groups therein.

Preferably A is carbon and R' is hydrogen or a methyl or an ethyl group.

L, when present, is preferably a sulfur atom with z=1. However L may also be a chain of up to about 20 atoms that may contain, for example, one or more unsubstituted or substituted alkylene, ester, thioester, amide, thioamide, ketone, thioketone, ether or thioether groups. Thus L may be, by way of example only, a polyalkylenethio group [—(CH$_2$)$_q$—S] group, where q is an integer from 1 to 20 and especially 9, a group —CO(CH$_2$)$_s$—S where s is from 1 to 20, a group —(CH$_2$)$_r$CO(CH$_2$)$_s$S, a group —CONH—(CH$_2$)$_r$—S, or a group (CH$_2$)$_r$NHCO(CH$_2$)$_r$S, where each r is independently from 1 to 5. z may alternatively be 0 so that there is no linking group L present.

$L_B$, when present, is a fragment of 1 to 20 atoms that may contain, for example, one or more unsubstituted or substituted alkylene, arylene, ester, thioester, amide, thioamide, ketone, thioketone, ether or thioether groups. Thus $L_B$ may be, by way of example only, an unsubstituted or substituted methylene, ethylene or propylene, keto, CONH(CH$_2$)$_r$, (CH$_2$)$_r$NR" (CH$_2$)$_r$, (CH$_2$)$_r$O(CH$_2$)$_r$, CHR$_3$COOR", where R" is hydrogen or an alkyl group and R$_3$ is a substituted alkylene group, (CH$_2$)$_r$NHCOCHCH$_2$CONH(CH$_2$)$_r$, phenylene, CH$_2$CHROphenylene or phenyleneCOO(CH$_2$)$_r$ group, where each r is independently from 1 to 5 and R is independently hydrogen or an alkyl group. p may alternatively be 0 so that there is no linking group $L_B$ present, but preferably p is 1 and $L_B$ is a methylene or ethylene group.

$L_D$ when present, is a fragment of 1 to 20 atoms that may contain one or more unsubstituted or substituted alkylene, arylene, ester, thioester, amide, thioamide, ketone, thioketone, ether or thioether groups. Thus $L_D$ may be, by way of example only, an ethylene, a CONH(CH$_2$)$_r$ or a (CH$_2$)$_r$CONR$_4$(CH$_2$)$_r$, where r is from 1 to 5 and R$_4$ is a substituted alkylene group. However it is preferred that q is 0 so that there is no linking group $L_D$ present.

Although D is preferably hydrogen or a basic group such as, for example, a dimethylamino or diethylamino group, it may also be an acid group or an ester or amide group. Generally y is 0 such that there is no E group but when present this may be as defined for D and may thus include a basic or an acidic group or an ester or amide thereof, preferably a dimethylamino or diethylamino group. The compound of formula (I) can thus contain up to three basic groups but it is essential that the number of basic groups is greater than the number of any acidic groups to provide the required overall basicity.

The number of monomer units (x) is preferably 10-100, more preferably 15 to 50, most preferably 15 to 35. As stated hereinbefore, preferably the polymer is polyacrylamide, although other polymers, such as, polymethacrylamide, poly-N-methylacrylamide or poly-N-methylmethacrylamide or a mixture thereof or a mixture containing a minor percentage of poly-N,N-di-methylacrylamide may be used.

Thus M may have either of the structures shown below, with the point of attachment to F being on the right hand side:

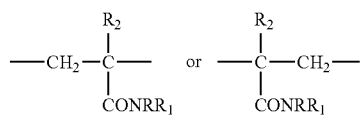

wherein

R, R$_1$ and R$_2$ are independently hydrogen or an unsubstituted or substituted lower alkyl group having 1 to 3 carbon atoms. When R, R$_1$ and R$_2$ are each hydrogen, then M is an unsubstituted acrylamide group and this is preferred. However if R and R$_1$ are each independently a methyl, ethyl, n-propyl, i-propyl or t-butyl group, then R$_2$ will normally be either hydrogen or a methyl group.

Generally any substitution on the alkyl group of R, R$_1$ and R$_2$ is other than by one or more hydroxyl, acidic or basic groups. For example, strongly adsorbing hydroxyl groups are to be avoided unless sterically inhibited from adsorption by adjacent non-adsorbing groups.

F is generally hydrogen but may also be a terminal substituent known to one skilled in the art as not having a significant effect on the aqueous solubility of the molecule. It may be, for example, a halogen atom, an unsubstituted or substituted alkyl group, a thiol, a neutral thioether, ether, ester, or an alkyl- or aryl-sulfonate group.

The combination of anchor moiety and polymer moiety chemistries is essential for the materials of the invention to function as highly effective dispersants. As will be exemplified hereinafter, if one of the materials of the invention is compared to its two component parts in isolation, for example polyacrylamide and the basic fragment 2-N,N-dimethylaminoethyl-, the component parts are unable to function as suitable dispersants within the definition and scope of the invention.

Moreover the chemical structures of the anchoring moieties defined in the invention can be important to the function of the materials of the invention as highly effective dispersants. As indicated earlier, the anchor moiety contains one or a small number of basic groups. However acid groups may also be present in the anchoring group in combination with basic groups, so long as there is an excess of basic groups in the anchoring moiety.

The chemical structure of the hydrophilic polymer moiety described in this invention can also be important for the materials of invention to function as highly effective dispersants in aqueous media. The affinity of the hydrophilic polymer for the surface of the solid particulates needs to be less than that of the anchoring moiety, otherwise the polymer is likely to adsorb to the surface of the solid particulates with the subsequent potential for bridging between the particles, which is likely to lead to particle aggregation. Hence hydrophilic polymers with both hydrogen bond-donating and hydrogen bond-accepting character are generally preferred and those that are of solely hydrogen bond-accepting character, such as polyethyleneoxide and poly-N,N-dimethyl-acrylamide, are avoided, except as minority components. However hydroxyl groups, which are both hydrogen bond-donating and hydrogen bond-accepting, are to be avoided as they strongly adsorb on negatively charged oxides such as silica. An exception would be when the hydroxyl groups are sterically inhibited from adsorption by adjacent non-adsorbing groups.

Structures pertaining to formula (I) are illustrated, but not limited to, the following examples (note they are general in terms of the degree of polymerisation x, which is defined above):

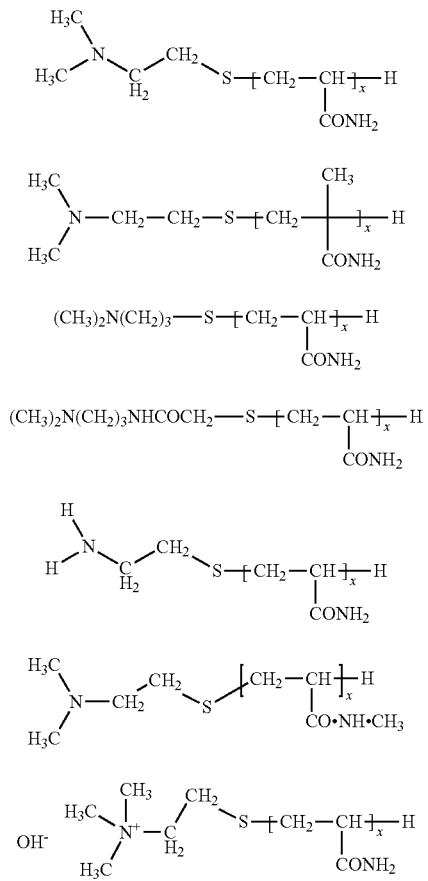
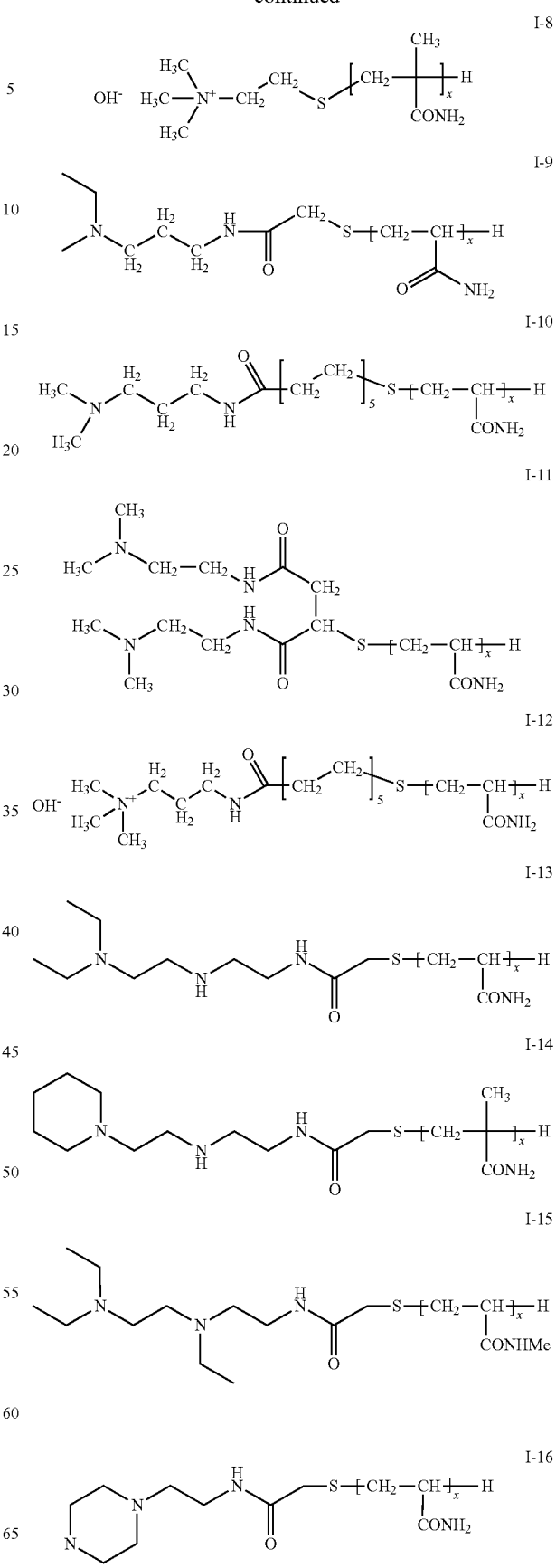

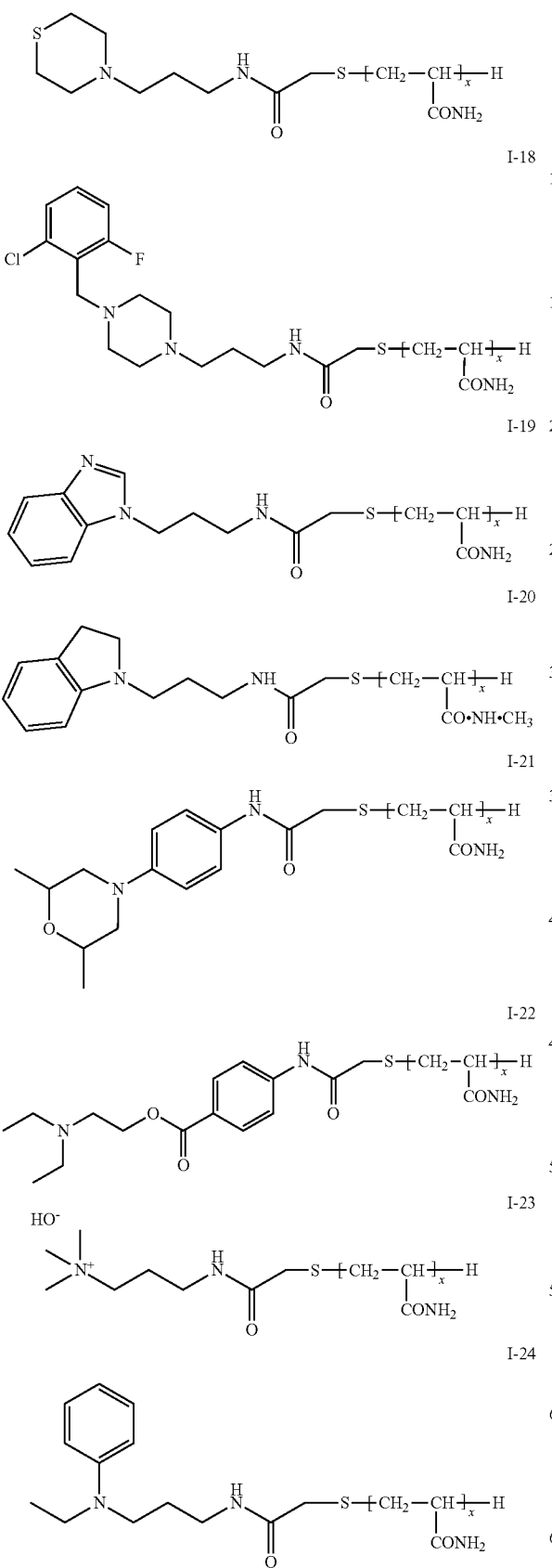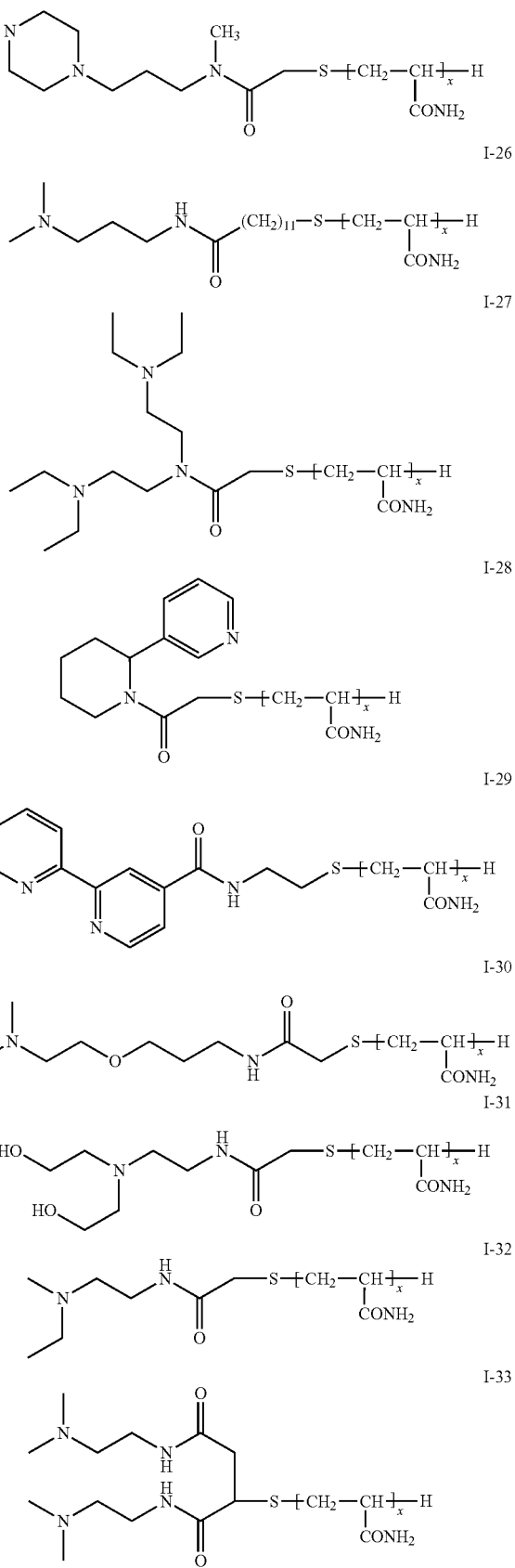

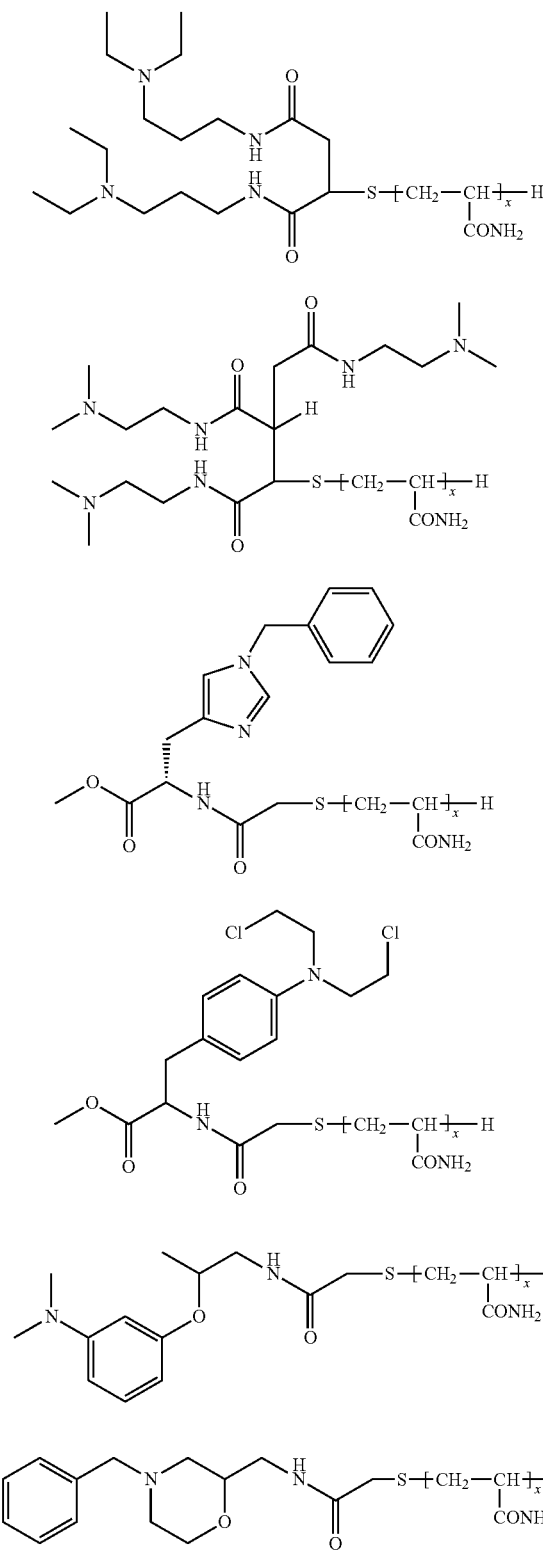

Several specific structures of the above systems, i.e. where the average degree of polymerisation is defined, are illustrated below by way of example:

| Dispersant | Average Structure (to nearest integer) | $M_n/$ g·mol$^{-1}$ |
|---|---|---|
| I-1a | H$_3$C—N(CH$_3$)—CH$_2$—CH$_2$—S—[CH$_2$—CH(CONH$_2$)]$_{20}$—H | ~1527 |
| I-2a | H$_3$C—N(CH$_3$)—CH$_2$—CH$_2$—S—[CH$_2$—C(CH$_3$)(CONH$_2$)]$_{16}$—H | ~1425 |
| I-5a | H—N(H)—CH$_2$—CH$_2$—S—[CH$_2$—CH(CONH$_2$)]$_{15}$—H | ~1354 |
| I-6a | H$_3$C—N(CH$_3$)—CH$_2$—CH$_2$—S—[CH$_2$—CH(CO·NH·CH$_3$)]$_{20}$—H | ~1800 |

In general, the solid particulates relating to this invention range in particle size from 1 nm to 100 micrometer, preferably from 5 nm to 10 micrometer, more preferably from 10 nm to 3 micrometer and most preferably from 50 nm to 1 micrometer.

The basic composition comprises negatively charged or chargeable solid particulates and an aqueous dispersing medium together with one or more dispersants of the invention and optionally a water-soluble binder and/or a pH modifier. According to the invention, the basic composition is prepared using a mechanical mixing device such as, for example a stirrer, homogeniser, milling device or high-pressure disperser.

If a water-soluble binder (or binders) is present it may be any binder known to the skilled person to be suitable for the purpose. Thus it may be a polymer, for example, starch and its modified products, polyvinyl alcohol and its modified products (e.g. acetyl acetylated polyvinyl alcohol), a polyvinyl acetate, hydroxycellulose, hydroxymethyl cellulose, carboxymethyl cellulose, polyvinyl pyrrolidone, polyvinylacetal including its derivatives and protein-derived polymers such as gelatin and its derivatives. Particularly preferred are polyvinyl alcohols having a degree of hydrolysis of 86-89%, such as Gohsenol™ GH-17, Gohsenol™ GH-20 and Gohsenol™ GH-23, obtainable from Nippon Gohsei, Japan. It may also be a latex polymer such as, for example, a styrene acrylic latex or styrene butadiene latex. The amount of binder will vary from application to application, but it is generally present in an amount of from 0 to 40% w/w with respect to the solid particles, more preferably from 0 to 20% w/w, most preferably from 0 to 10% w/w.

A pH modifier could be any suitable organic or inorganic base or acid, as long as the amount added does not adversely affect the performance of the dispersant.

Optionally, the composition may include other additives such as, for example, fillers or plasticisers, colorants (pigments or dyes), frost inhibitors, hardeners, accelerators, antioxidants, bactericides, antistatic agents, UV absorbers, UV light stabilizers and materials that limit the adverse effects of atmospheric gases or contaminants. These may be introduced into the basic composition to produce a more complex composition, for example, by solubilising (or dispersing) the additives into an aqueous solution (or dispersion) and mixing the resulting solution (or dispersion) of additives with the initial basic aqueous composition of solid particulate.

The solid particulate content in the dispersions of the invention normally ranges from a volume fraction of solids of about 0.02 to about 0.8, preferably about 0.1 to about 0.6, more preferably about 0.2 to about 0.5. The % w/w content will vary with density of the dispersed solids, but in general the level is chosen such that the dispersion can be dispersed well with the dispersants of the invention and that the final dispersion is processable and manageable due to its improved dispersability and flowability. One of the most common naturally occurring negatively charged solids is silica (silicon dioxide). Silica is of much lower density than most metal oxides and there are many sources that possess high surface area per gram and hence the ratio of dispersant to solid required on a weight basis to provide good dispersion can be much higher than that experienced for positively charged or chargeable particulate systems.

The dispersant content in the dispersion is typically used in the range 1:1000 to 1000:1000 w/w particulate solid, preferably 10:1000 to 800:1000 w/w particulate solid, more preferably 30:1000 to 600:1000 w/w particulate solid and most preferably 50:1000 to 500:1000 w/w particulate solid. However, given it is well known to those skilled in the art that the dispersants act at the particle surface, it is also well accepted by those practitioners that higher concentrations of dispersant will be required as particle sizes are reduced further and further due to the resulting increase in surface area.

A particular advantage of the dispersions of the invention is their use as components of coating materials in view of their improved dispersability and flowability after subjection to high shear.

Coating compositions using dispersants of the invention may be applied to one or both of a substrate surface through pre-metered or post-metered coating methods. These methods may include dip-coating, wound-wire rod coating, grooved rod coating, smooth rod coating, air knife coating, bent or bevelled blade coating, gravure coating, forward roll coating, reverse roll coating, multiple roll coating, slide coating, bead coating, extrusion coating and curtain coating. Known coating and drying methods are described in further detail in Research Disclosure No. 308119, published December 1989, pages 1007 to 1008. The coating composition can be coated either from water, water-based mixtures or organic solvents but water is preferred.

The choice of coating process would be determined from the economics of the operation and, in turn, would determine the formulation specifications such as coating solids, coating viscosity and coating speed. After application to the substrate, the coating fluids are generally dried by simple evaporation, which may be accelerated by known techniques such as convection heating. Further treatment, such as calendaring, may be used to apply a surface texture.

The substrate may be, for example, textiles, wood, metal or plastic, depending upon the proposed application. In a preferred embodiment, the substrate or support for use in the invention is paper, resin-coated paper or a transparent support. It may have a thickness of from about 10 to about 500 μm, preferably from about 50 to about 300 μm. Antioxidants, antistatic agents, plasticizers and other known additives may be incorporated into the support, if desired.

If the dispersion is to be used in an inkjet recording element, the support may be any of those usually used for inkjet receivers, such as resin-coated paper, paper, polyesters, or microporous materials such as polyethylene polymer-containing material sold by PPG Industries, Inc., Pittsburgh, Pa. under the trade name of TESLIN™, TYVEK™ synthetic paper (DuPont Corp.), and OPPalyte™ films (Mobil Chemical Co.) and other composite films listed in U.S. Pat. No. 5,244,861. Opaque supports include plain paper, coated paper, synthetic paper, photographic paper support, melt-extrusion-coated paper and laminated paper, such as biaxially oriented support laminates. Biaxially oriented support laminates are described in U.S. Pat. Nos. 5,853,965; 5,866,282; 5,874,205; 5,888,643; 5,888,681; 5,888,683 and 5,888,714, the disclosures of which are hereby incorporated by reference. These biaxially oriented supports include a paper base and a biaxially oriented polyolefin sheet, typically polypropylene, laminated to one or both sides of the paper base. Transparent supports include glass, cellulose derivatives, e.g., a cellulose ester, cellulose triacetate, cellulose diacetate, cellulose acetate propionate, cellulose acetate butyrate; polyesters, such as poly(ethylene terephthalate), poly(ethylene naphthalate), poly(1,4-cyclohexanedimethylene terephthalate), poly(butylene terephthalate), and copolymers thereof; polyimides; polyamides; polycarbonates; polystyrene; polyolefins, such as polyethylene or polypropylene; polysulfones; polyacrylates; polyetherimides; and mixtures thereof. The papers listed above include a broad range of papers, from high end papers, such as photographic paper to low end papers, such as newsprint.

The patents and publications referred to herein are incorporated by reference in their entirety.

The invention will now be described with reference to the following examples, which are not however to be construed as limiting the scope thereof.

EXAMPLES

Synthesis of Dispersants

The dispersants may be prepared by methods analogously to the examples herein and in accordance with Makromoleculare Chemie, (1992), 193(9), pages 2505-2517.

Example A

Synthesis of Compound (I-1a)

2-(Dimethylamino)ethanethiol hydrochloride (1.00 g, 7.06 mmol), acrylamide (10.03 g, 0.141 mol) and 2,2'-azobis(2-methylpropionitrile) (0.23 g) were suspended in methanol (100 ml) in a 3N flask equipped with a reflux condenser. The mixture was degassed for 20 min. by bubbling argon gas through it and then brought to reflux under argon atmosphere. Reflux was continued for a total of 16 h to ensure complete consumption of the monomer. The solid white mass that formed on cooling was filtered and washed with a small quantity of methanol, and then dried in vacuo at 40° C. to give a white solid (7.50 g, 66%). Analysis was consistent with the desired structure. Mass spectrometry (MALDI-TOFS) confirmed the presence of the anchor group in the polymer.

An ion-exchange column was charged with Amberlyst A26 (OH)(25 g) and covered with deionized water. 1M Aqueous sodium hydroxide (10 ml) was added to the column and this was flushed through with deionised water (300 ml). The final pH of the eluent was between 6 and 7. The oligomeric hydrochloride from above (7.5 g) was dissolved in water (70 ml), and added to the column. This was flushed with deionised water (300 ml) until the pH of the eluent became slightly acidic. Eluent cuts containing product were combined and freeze-dried, affording the free amine-terminated oligomer. Analysis confirmed the presence of the terminal amine group.

Example B

Synthesis of Compound (I-2a)

2-(Dimethylamino)ethanethiol hydrochloride (1.00 g, 7.06 mmol), methacrylamide (12.00 g, 0.141 mol) and 2,2'-azobis (2-methylpropionitrile) (0.23 g) were suspended in methanol (100 ml) in a 3N flask equipped with a reflux condenser. The mixture was degassed for 20 min. by bubbling argon gas through it and then brought to reflux under argon atmosphere. Reflux was continued for a total of 16 h to ensure complete consumption of the monomer. The solid white mass that formed on cooling was filtered and washed with a small quantity of methanol, and then dried in vacuo at 40° C. to give a white solid (8.00 g, 61%). Analysis was consistent with the desired structure. Mass spectrometry (MALDI-TOFS) confirmed the presence of the anchor group in the polymer.

An ion-exchange column was charged with Amberlyst A26 (OH)(25 g) and covered with deionised water. 1M Aqueous sodium hydroxide (10 ml) was added to the column, and this was flushed through with deionised water (300 ml). The final pH of the eluent was between 6 and 7. The oligomeric hydrochloride from above (7.7 g) was dissolved in water (70 ml) and added to the column. This was flushed with deionised water (300 ml) until the pH of the eluent became slightly acidic. Eluent cuts containing product were combined and freeze-dried, affording the free amine-terminated oligomer. Analysis confirmed the presence of the terminal amine group.

Example C

Synthesis of Compound (I-5a)

2-Aminoethanethiol hydrochloride (0.80 g, 7.06 mmol), acrylamide (10.03 g, 0.141 mol) and 2,2'-azobis(2-methylpropionitrile) (0.23 g) were suspended in methanol (100 ml) in a 3N flask equipped with a reflux condenser. The mixture was degassed for 20 min. by bubbling argon gas through it and then brought to reflux under argon atmosphere. Reflux was continued for a total of 16 h to ensure complete consumption of the monomer. The solid white mass that formed on cooling was filtered and washed with a small quantity of methanol, and then dried in vacuo at 40° C. to give a white solid (8.50 g, 78%). Analysis was consistent with the desired structure. Mass spectrometry (MALDI-TOFS) confirmed the presence of the anchor group in the polymer.

An ion-exchange column was charged with Amberlyst A26 (OH)(25 g) and covered with deionised water. 1M Aqueous sodium hydroxide (10 ml) was added to the column and this was flushed through with deionised water (300 ml). The final pH of the eluent was between 6 and 7. The oligomeric hydrochloride from above (7.7 g) was dissolved in water (70 ml) and added to the column. This was flushed with deionised water (300 ml) until the pH of the eluent became slightly acidic. Eluent cuts containing product were combined and freeze-dried, affording the free amine-terminated oligomer. Analysis confirmed the presence of the terminal amine group.

COMPARATIVE EXAMPLES

The efficacy of the dispersants of the invention was tested further by comparing their performance against the following controls:

(a) no dispersant;

(b) representative prior art bases as dispersants—C1 and C2;

(c) a dispersant comprising solely a typical 'anchor' component of a dispersant of the invention, i.e. no 'buoy' component—C3

(d) a dispersant comprising solely a typical 'buoy' component of a dispersant of the invention, i.e. no 'anchor' component—C4;

(e) representative dispersants designed for positively charged or chargeable particulate dispersions, as disclosed in WO 2006/067453 and WO 2006/067457, that would not be expected to be effective in negatively charged or chargeable particulate systems—C5-C8;

(f) a representative dispersant of similar structure to those of the invention comprising a basic anchor group and a polymeric 'buoy' component based on a monomer containing hydroxyl groups—C9;

(g) a representative dispersant of the invention with an N,N-di-methylamino anchor group converted to its corresponding hydrochloride form—C10.

The compounds used in the above list, are detailed below:

| Dispersant | Structure | $M_n$/g·mol$^{-1}$ | Name |
| --- | --- | --- | --- |
| C1 | NaOH | 40.0 | Sodium hydroxide (Aldrich) |
| C2 | H₃C-NH-CH₂-CH(OH)-CH(OH)-CH(OH)-CH(OH)-CH₂OH | 192.1 | N-methylglucamine (Aldrich) |
| C3 | (H₃C)₂N-CH₂-CH₂-OH | 89 | N,N-dimethylethanolamine (Aldrich) |
| C4 | -[CH₂-CH(C(O)NH₂)]ₙ- | 2500 | Polyacrylamide, Cyanomer N10 (American Cyanamid Co.) |

| Dispersant | Structure | $M_n/g \cdot mol^{-1}$ | Name |
|---|---|---|---|
| C5 | | 2060 | WO 2006/067453 and WO 2006/067457 |
| C6 | | 2660 | WO 2006/067453 and WO 2006/067457 |
| C7 | | 2275 | WO 2006/067453 and WO 2006/067457 |
| C8 | | 1610 | WO 2006/067453 and WO 2006/067457 |
| C9 | | 2733 | A compound structured like those of formula (I), but with pendant hydroxyl groups on the polymeric moiety |
| C10 | | ~1462 | An example of the hydrochoride form of a compound of formula (I) i.e. ammonium salt form of I-2a |

Example 1

Control: Aerosil™200 Dispersion in Water with No Dispersant

This example represents the basic test dispersion without any dispersant and so can be regarded as the control system. 1.20 g of Aerosil™200 (fumed silica powder, primary particle size 12 nm, manufactured by Degussa AG) were weighed out into a glass vial, 9.71 g Millipore™-purified water added, the vial sealed and the resulting dispersion agitated at room temperature in its sealed container until the system became uniform in nature, whether fluid or gel. The final composition on a w/w basis was: 11% Aerosil™200, 89% water. The sample was left standing for over 1 h and then stirred again in readiness for rheological and pH measurements.

To facilitate the rheological testing—particularly in relation to the gelled systems—the rheological behaviour of the systems was measured in an oscillatory mode using a Bohlin™ CS-50 rheometer. In general the rheology was measured as follows:

i An oscillation time sweep was performed to check that the rheology was stable over short timescales (post sample loading). It was found that there was little change with time, so this measurement was not always performed.

ii A stress sweep in oscillation ("up and down") was then performed to determine the yield stress for the freshly loaded sample.

iii A stress sweep in viscosity was then run with increasing and decreasing stress and repeated. The first "up" sweep was always found to have a higher viscosity than subsequent runs indicating that the sample was broken down or better dispersed for the subsequent runs. After the first "up" sweep, "up and down" sweeps were very similar, suggesting that the structure broken down by the stress rebuilds rapidly.

iv A second "up and down" stress sweep in oscillation was finally performed to determine the yield stress of the material once exposed to high shear (dispersed). To avoid unnecessary confusion, the "up" sweep curve data was used for comparison and differentiation between systems. To simplify matters further, the complex modulus at 0.1 Pa oscillatory stress, $CM^{0.1}$, was recorded from the "up" sweep curve data as a single value parameter to characterize the system for the purpose of comparison and differentiation between systems (as described previously).

Oscillatory measurements were performed at a constant frequency of 1 rad.s$^{-1}$ and the complex modulus (=stress/strain) was monitored as a function of applied stress. In all cases, the pH of all the system was also monitored.

The second "up" oscillation sweep of Example 1 is represented by Curve A in FIG. 1. The final sample was perceived to be a weak gel with a high complex modulus parameter ($CM^{0.1}$=53 Pa) and a low pH (4.1).

The $CM^{0.1}$ and pH values, and physical state for this example and Examples 2-9 and 15-17, are presented in Table 2 below. In each of the following examples, the rheology of the systems was measured in the same manner as described above in this example.

Examples 2 to 4 show the effect of adding a representative inorganic base (sodium hydroxide) stepwise to the control dispersion to determine its impact on fluidization and pH.

Example 2

Aerosil™200 Dispersion in 15 mM Dispersant C1 Solution in Water

An aqueous dispersion of Aerosil™200 was made up in the same way as described in Example 1, with the exception that an aqueous solution of 15 mM sodium hydroxide was used in place of the water.

Curve B in FIG. 1 represents the second "up" oscillation sweep of Example 2. The final sample was perceived to be a fairly weak gel (i.e. weaker than that found for Example 1) with a moderate complex modulus parameter ($CM^{0.1}$=6.7 Pa) and a significantly higher pH (9.1) than Example 1.

Example 3

Aerosil™200 Dispersion in 25 mM Dispersant C1 Solution in Water

An aqueous dispersion of Aerosil™200 was made up in the same way as described in Example 1, with the exception that an aqueous solution of 25 mM sodium hydroxide was used in place of the water.

Curve C in FIG. 1 represents the second "up" oscillation sweep of Example 3. The final sample was perceived to be a fluid system of pH 9.6 with a low complex modulus parameter ($CM^{0.1}$=0.15 Pa). This concentration of sodium hydroxide reduced the $CM^{0.1}$ value by over 2.5 orders of magnitude relative to the 'no dispersant' case in Example 1 and by over 1.5 orders of magnitude relative to Example 2 which had a lower concentration of sodium hydroxide. However, this increase in fluidity was obtained at the expense of raising the pH of the system to 9.6.

Example 4

Aerosil™200 Dispersion in 40 mM Dispersant C1 Solution in Water

An aqueous dispersion of Aerosil™200 was made up in the same way as described in Example 1, with the exception that an aqueous solution of 40 mM sodium hydroxide was used in place of the water.

Curve D in FIG. 1 represents the second "up" oscillation sweep of Example 4. The final sample was perceived to be a fluid system of pH 10.1 with a low complex modulus parameter ($CM^{0.1}$=0.062 Pa). This concentration of sodium hydroxide reduced the $CM^{0.1}$ value by almost 3 orders of magnitude relative to the 'no dispersant' case in Example 1, by about 2 orders of magnitude relative to Example 2, and finally by a factor of 2 relative to Example 3 (the latter two examples possessing lower concentrations of sodium hydroxide). However, this increase in fluidity was obtained at the expense of raising the pH of the system even further to 10.1.

Examples 5 and 6 investigate the effect of adding a representative hydrophilic organic base, in this case dispersant C2 (N-methylglucamine), to determine its impact on fluidization and pH.

Example 5

Aerosil™200 Dispersion in Aqueous Solution with 0.256% w/w Dispersant C2

An aqueous dispersion of Aerosil™200 was made up in the same way as described in Example 1, with the exception that an aqueous solution of dispersant C2 was used in place of the water, such that the concentration of C2 in the system was 0.256% w/w (13 mM).

The final sample was perceived to be a weak gel (slightly weaker than that found for Example 1) with a high complex modulus parameter ($CM^{0.1}$=15 Pa) and a moderately high pH of 8.7. Hence this concentration of base was not able to fluidize the Aerosil™200 dispersion.

Example 6

Aerosil™200 Dispersion in Aqueous Solution with 0.639% w/w Dispersant C2

An aqueous dispersion of Aerosil™200 was made up in the same way as described in Example 1, with the exception that an aqueous solution of dispersant C2 was used in place of the water, such that the concentration of C2 in the system was 0.639% w/w (33 mM).

The final sample was perceived to be a viscous fluid with a moderate-low value of the complex modulus parameter ($CM^{0.1}$=0.58 Pa) and a high pH of 9.6, which was significantly higher than Examples 1 and 5, and comparable with Example 3. Although this concentration of C2 was able to fluidize the Aerosil™200 dispersion it was only able to do so at the expense of raising the pH to a relatively high level.

The objectives of Examples 7 to 9 were:
  i to investigate the effect of adding an alternative organic base to the control system of Example 1 and
  ii to investigate a base that is representative of a typical anchor group of the invention, i.e. to test the anchor chemistry in isolation.

Example 7

Aerosil™200 Dispersion in Aqueous Solution with 0.12% w/w Dispersant C3

An aqueous dispersion of Aerosil™200 was made up in the same way as described in Example 1, with the exception that an aqueous solution of dispersant C3 was used in place of the water, such that the concentration of C3 in the system was 0.12% w/w (13 mM). C3 is N,N-dimethylethanolamine, a N,N-dimethylaminoethyl end group being a typical basic anchor for the invention.

The final sample was perceived to be a weak gel (slightly stronger than that found for Example 1) with a high complex modulus parameter ($CM^{0.1}$=96 Pa) and a significantly higher pH (8.7) than Example 1. Its pH was similar to that of Example 5, which contained dispersant C2 at an equivalent concentration. As with Example 5, this concentration of base was not able to fluidize the Aerosil™200 dispersion.

Example 8

Aerosil™200 Dispersion in Aqueous Solution with 0.17% w/w Dispersant C3

An aqueous dispersion of Aerosil™200 was made up in the same way as described in Example 1, with the exception that an aqueous solution of dispersant C3 was used in place of the water, such that the concentration of C3 in the system was 0.17% w/w (19 mM).

The final sample was perceived to be a weak gel with a high value of the complex modulus parameter ($CM^{0.1}$=21 Pa, a slightly weaker gel than that found for Examples 1 and a slightly stronger gel than that found for Example 5) and a high pH (8.9) relative to Example 1. Hence this concentration of the base C3 was not able to fluidize the Aerosil™200 dispersion.

Example 9

Aerosil™200 Dispersion in Aqueous Solution with 0.29% w/w Dispersant C3

An aqueous dispersion of Aerosil™200 was made up in the same way as described in Example 1, with the exception that an aqueous solution of dispersant C3 was used in place of the water, such that the concentration of C3 in the system was 0.29% w/w (33 mM).

The final sample was perceived to be a viscous fluid system with a low value of the complex modulus parameter ($CM^{0.1}$=0.21 Pa) and a significantly higher pH (9.4) than Examples 1 and 8. Its pH was similar to that of Example 6, which contained an equivalent amount of the base dispersant C2 and also of Example 3, which contained 25 mM NaOH. This similarity suggests that fluidity of the dispersion only comes at the expense of generating a high pH in the system by adding base. It also shows that if the anchor group of a compound of the invention is used in isolation it only generates fluidity at relatively high pH.

The objective of the following example was to determine the impact the chemistry of a preferred polymer moiety of the invention has on the system when used in isolation (from its anchor moiety) from a chemical perspective.

Example 10

Aerosil™200 Dispersion in Aqueous Solution with Dispersant C4

An aqueous dispersion of Aerosil™200 was made up in the same way as described in Example 1, with the exception that an aqueous solution of dispersant C4 (polyacrylamide—Cyanomer N-10 supplied by American Cyanamid Co., MW=1.5 kg·mol$^{-1}$, 30% solids) was used in place of the water, such that the final concentration ranges (w/w) were: 2.0%, 3.0% and 5.0%, representing w/w concentration ranges of dispersant to Aerosil™200 from 182:1000 to 455:1000. Here C4 represented a preferred polymer moiety of a dispersant of the invention.

The Aerosil™200 powder was not dispersed satisfactorily, even into a uniform gel state, at any of these concentrations of dispersant C4. Hence a preferred polymer moiety of the invention was not effective as a dispersant, when used in chemical isolation, i.e. not bonded chemically to a suitable anchor moiety as defined for a dispersant of the invention.

In Examples 11 to 14 the objective was to compare the impact on fluidization and pH of dispersants described in WO 2006/067453 and WO 2006/067457, pertaining to dispersants for positively charged or chargeable solid particulates, with dispersants of the invention.

Example 11

Aerosil™200 Dispersion in Aqueous Solution with Dispersant C5

Dispersant C5 is of similar structure to the dispersants of this invention but with the difference that it has two carboxylic acidic groups, which has proved successful for dispersing positively charged or chargeable particulate dispersions in the aforementioned patent applications. Such a dispersant was considered to be less likely to be effective for dispersing negatively charged or chargeable particulate systems, such as Aerosil™200.

An aqueous dispersion of Aerosil™200 was made up in the same way as described in Example 1, with the exception that an aqueous solution of dispersant C5 was used in place of the water such that the concentration of C5 in the system was 5.0% w/w, i.e. at a comparable concentration to that found effective for the dispersants of this invention in relation to dispersions of Aerosil™200.

The dispersant C5 was found to be ineffective for dispersing Aerosil™200. On mixing the system formed a stiff solid paste of non-uniform consistency.

Example 12

Aerosil™200 Dispersion in Aqueous Solution with Dispersant C6

C6 is another example of a dispersant that was found suitable for positively charged or chargeable particulate dispersions as disclosed in the aforementioned patent applications, but it differs from C5 insofar as it possesses a single carboxylic acid anchor group as opposed to a dicarboxylic acid anchor group. Such dispersants were considered to be less likely to be effective for dispersing negatively charged or chargeable particulate systems, such as Aerosil™200.

An aqueous dispersion of Aerosil™200 was made up in the same way as described in Example 1, with the exception that an aqueous solution of dispersant C6 was used in place of the water, such that the concentration of C6 in the system was 5.0% w/w, i.e. at a comparable concentration to that found effective for the dispersants of this invention in relation to dispersions of Aerosil™200.

The dispersant C6 was found to be ineffective for dispersing Aerosil™200. On mixing the system formed a stiff solid paste of non-uniform consistency.

Example 13

Aerosil™200 Dispersion in Aqueous Solution with Dispersant C7

C7 is a further example of a dispersant that was found suitable for positively charged or chargeable particulate dispersions as disclosed in the aforementioned patent applications, but it differs from C5 and C6 insofar as the anchor group includes a sulfonic acid group as opposed to a carboxylic acid group. Such dispersants were considered to be less likely to be effective for dispersing negatively charged or chargeable particulate systems, such as Aerosil™200.

An aqueous dispersion of Aerosil™200 was made up in the same way as described in Example 1, with the exception that an aqueous solution of dispersant C7 was used in place of the water, such that the concentration of C7 in the system was 5.0% w/w, i.e. at a comparable concentration to that found effective for the dispersants of this invention in relation to dispersions of Aerosil™200.

The dispersant C7 was found to be ineffective for dispersing Aerosil™200. On mixing the system formed a stiff solid paste of non-uniform consistency.

Example 14

Aerosil™200 Dispersion in Aqueous Solution with Dispersant C8

C8 is a further example of a dispersant that was found suitable for positively charged or chargeable particulate dispersions as disclosed in the aforementioned patent applications but it differs from C5 to C7 insofar as the anchor group involves an amino-acid which possesses both a basic group and an acid group, as opposed to one or more acid groups, i.e. it is zwitterionic. Such dispersants were considered to be less likely to be effective for dispersing negatively charged or chargeable particulate systems, such as Aerosil™200.

Two aqueous dispersions of Aerosil™200 were made up in the same way as described in Example 1, with the exception that an aqueous solution of dispersant C8 was used in place of the water, such that the concentration of C8 in the system was 2.7% w/w in one case and 5.0% w/w in the second case, i.e. at a comparable concentration to that found effective for the dispersants of this invention in relation to dispersions of Aerosil™200.

The dispersant C8 was found to be ineffective for dispersing Aerosil™200 at either concentration. On mixing, the samples were highly viscous with a clear yield stress (similar to the sample with no dispersant added). However, the samples were insufficiently fluid to be able to syringe them into the rheometer, and the higher concentration sample had to be forced in with a spatula. The sample was found to be fully solid up to 200 Pa in viscometry, and up to 50 Pa in oscillation where it gave a modulus of 10,000 Pa, which was invariant with stress. Both samples were therefore effectively solid.

EXAMPLES OF THE INVENTION

Examples 15 to 17 all illustrate the use of a dispersant of the invention I-1a. In each example the rheology of this system was measured in the same manner as described in Example 1. The $CM^{0.1}$ and pH values and physical state, are presented in Table 2 for comparison with the Comparative Examples 1-14.

Example 15

Control+Dispersant of the Invention I-1a at 2% w/w

An aqueous dispersion of Aerosil™200 was made up in the same way as the control system described in Example 1, with the exception that an aqueous solution of dispersant I-1a was used in place of the water, such that the concentration of I-1a in the system was 2.0% w/w (13 mM or 182:1000 with respect to Aerosil™200).

The final sample was perceived to be a viscous fluid with a moderate value of the complex modulus parameter ($CM^{0.1}$=3.0 Pa) and a relatively low pH of 7.7, only 0.7 above neutral pH. Compared to Examples 2, 5 and 7, which were all gels of pH 8.7-9.1 and which contained comparative dispersants at a near equivalent concentration, this example was fluid and an order of magnitude lower in pH.

Example 16

Control+Dispersant of the Invention I-1a at 3% w/w

An aqueous dispersion of Aerosil™200 was made up in the same way as the control system described in Example 1, with the exception that an aqueous solution of dispersant I-1a was used in place of the water, such that the concentration of I-1a in the system was 3.0% w/w (20 mM or 273:1000 with respect to Aerosil™200).

The final sample was perceived to be a fluid with a low value of the complex modulus parameter ($CM^{0.1}$=0.21 Pa) and a relatively low pH of 8.0, only 1.0 unit above neutral pH. Compared to Example 8, which was a gel of pH 8.9 and which contained a comparative dispersant at a near equivalent concentration, this example was fluid and almost an order of magnitude lower in pH.

Example 17

Control+Dispersant of the Invention I-1a at 5% w/w

An aqueous dispersion of Aerosil™200 was made up in the same way as the control system described in Example 1, with the exception that an aqueous solution of dispersant I-1a was used in place of the water, such that the concentration of I-1a in the system was 5.0% w/w (33 mM or 455:1000 with respect to Aerosil™200).

The final sample was perceived to be a fluid with a low value of the complex modulus parameter ($CM^{0.1}$=0.081 Pa) and a relatively low pH of 8.4, only 1.4 above neutral pH. Compared to Examples 3, 4, 6 and 9, which are also fluids and which contain comparative dispersants at a similar or near equivalent concentration, this example was between 1.0 and 1.7 orders of magnitude lower in pH.

TABLE 2

Rheological properties of dispersants for use in the invention I-1a, a control and comparative compounds C1-C8

| Ex. No. | Test System + Dispersant | $CM^{0.1}$/ Pa | pH | State |
|---|---|---|---|---|
| 1 | Control (no dispersant) | 53 | 4.1 | Weak gel |
| 2 | Control + 15 mM C1 | 6.7 | 9.1 | Weaker gel |
| 3 | Control + 25 mM C1 | 0.15 | 9.6 | Fluid |
| 4 | Control + 40 mM C1 | 0.062 | 10.1 | Fluid |
| 5 | Control + 0.256% C2 | 15 | 8.7 | Weak gel |
| 6 | Control + 0.639% C2 | 0.58 | 9.6 | Viscous fluid |
| 7 | Control + 0.12% C3 | 96 | 8.7 | Weak gel |
| 8 | Control + 0.17% C3 | 21 | 8.9 | Weaker gel |
| 9 | Control + 0.29% C3 | 0.21 | 9.4 | Viscous fluid |
| 10 | Control + 2, 3, or 5% C4 | — | — | Not dispersed uniformly |
| 11 | Control + 5% C5 | — | — | Stiff paste |

TABLE 2-continued

Rheological properties of dispersants for use in the
invention I-1a, a control and comparative compounds C1-C8

| Ex. No. | Test System + Dispersant | $CM^{0.1}/$ Pa | pH | State |
|---|---|---|---|---|
| 12 | Control + 5% C6 | — | — | Stiff paste |
| 13 | Control + 5% C7 | — | — | Stiff paste |
| 14 | Control + 2.7 or 5% C8 | — | — | Solid paste |
| 15 | Control + 2% I-1a (invention) | 3 | 7.7 | Viscous fluid |
| 16 | Control + 3% I-1a (invention) | 0.21 | 8.0 | Fluid |
| 17 | Control + 5% I-1a (invention) | 0.081 | 8.4 | Fluid |

In summary, the results in Table 2 demonstrate that dispersant I-1a for use in the invention is able to reduce the viscosity of aqueous dispersions of negatively charged or chargeable solid particulates, herein illustrated by fumed silica, especially with a high solids content, provided a suitable concentration of dispersant is found. Furthermore, it shows that the real advantage of the dispersant for use in the invention is that it achieves this without increasing the pH of the system as far above neutral as typical dispersants of a basic nature, which need to increase the pH to a value of around 9.5 or more to provide significant fluidity (i.e. $CM^{0.1}$=0.2-0.6 Pa). Such prior art dispersants include strong bases, such as sodium hydroxide, or weaker organic bases based on amines. In contrast the dispersant of the invention I-1a provides the same degree of fluidity (i.e. $CM^{0.1}$=0.2 Pa) in the system at around pH 8. As with most dispersants, those for use in the invention possess an optimum concentration for maximum performance, which depends on the solid particulate system, its concentration, its particle size, pH and other addenda.

The dispersants for use in the invention are designed to work with solid particulates and in particular inorganic oxides that are above their isoelectric point (IEP) i.e. where they are negatively charged, which in practical terms for aqueous systems in the absence of acid or base, means solid particulates with an IEP below pH 5.8, i.e. the pH of water saturated with carbon dioxide. Silica is good example of such a system which has an IEP around pH 2.

The above results with I-1a suggest that dispersants of the invention can reduce the dispersion to a fluid system with a definable low shear viscosity at a pH that can be significantly less than 9, i.e. 8.5 or as low as 8.0 or even as low as 7.7, whereas the control dispersion, or the control dispersion with a comparison dispersant (see Table 2), results in a gelling or poorly dispersed system at these pHs. Examples 16 and 17 demonstrate that a dispersant of the invention lowers the viscosity of a dispersion system so effectively that more solids can be added to the system without making the viscosity or yield stress any higher than the original dispersion system in the absence of dispersant. It is thus established that dispersants for use in the invention permit increased loading of solids in such dispersions.

Hence another useful parameter to distinguish the dispersants for use in the invention from the comparative materials of a basic nature is the difference between $CM_{No\ Disp}^{0.1}$, i.e. the upper limiting value of $CM^{0.1}$ at zero dispersant concentration, and $CM^{0.1}$ at the point that sufficient material has been added to increase the pH of the system to a value of 8 (defined as $CM_{pH8}^{0.1}$).

A useful way of representing this difference is by the relative factor $RelCM_{pH8}^{0.1}$ wherein $$RelCM_{pH8}^{0.1} = \frac{CM_{pH8}^{0.1}}{CM_{NoDisp}^{0.1}},$$

i.e. the relative reduction in $CM^{0.1}$ at pH8 relative to the initial $CM^{0.1}$ value at zero additive. Hence if $RelCM_{pH8}^{0.1} \ll 1$, then the material under test is an effective dispersant in terms of a significant reduction in the complex modulus at low oscillatory stress (i.e. lower viscosity at low shear stress) at the near-neutral pH value of 8. If $RelCM_{pH8}^{0.1}$=~1 then the material under test is ineffective at modifying the rheology of the system at pH8. If $RelCM_{pH8}^{0.1}$ is $\gg 1$, then the material under test is acting as a thickener of the system, i.e. opposite in nature to the dispersants of the invention. In the case of the dispersant for use in the invention, I-1a, $RelCM_{pH8}^{0.1}$=0.0040 and so I-1a is demonstrated to be very effective at reducing the viscosity at pH8.

Examples 15-17 in Table 2, show that when anchor and polymer moieties of a structure of one of the preferred dispersants of the invention, namely an N,N dimethylaminoethyl moiety and polyacrylamide are chemically linked together in an anchor-polymer conformation as defined in the invention, in this case as I-1a, the resulting compound reduces the viscosity of the dispersion by a totally unexpected magnitude for systems with a pH of 9 or below. In contrast, Examples 7 to 9 plus Example 10 show respectively that when the anchor chemistry (N,N di-methylaminoethyl moiety) or polyacrylamide chemistry (with an average molecular weight of similar magnitude to that of a dispersant of the invention) are used in isolation they are either incapable of fluidizing the control dispersion to pH 9 or below or are incapable of fluidizing the control dispersion per se. Finally, Examples 11 to 14 show that if the dispersants described in WO 2006/067453 and WO 2006/067457, which pertain to dispersants for positively charged or chargeable solid particulates, are trialled as dispersants in the negatively charged fumed silica (Aerosil™200) dispersion control system of this invention, they are ineffective as dispersants in this system. On mixing they form stiff solid pastes of non-uniform consistency.

The above synopsis shows the importance in the invention of the combination of an anchor group of an overall basic nature with stabilizing polymer moieties for dispersing negatively charged or chargeable particulate systems, without increasing the system pH beyond 9.

Although the differential in performance between the dispersants for use in the invention and common basic chemicals (such as strong bases like sodium hydroxide or weaker organic bases based on amines) is clear from Table 2 and the parameter $RelCM_{pH8}^{0.1}$, it does not give an overall average picture. This arises from the non-exact matching of data points due to the lack of control over $CM^{0.1}$ and pH, which are both parameters of response. It is therefore useful to depict the data in a graphical way.

FIG. 2 encompasses the relevant data from Table 2 in a plot of log [$CM^{0.1}$] versus pH. The data appears to take the form of sigmoid-shaped curve, and as such can be modelled with a power law formula that is often used for sigma shaped curves, e.g. surface-tension/log-concentration data and logarithmic rheological data. The formula takes the following form:

$$CM^{0.1} = \frac{(CM_{NoDisp}^{0.1} - CM_{Lim}^{0.1})}{(1 + [pH/pH_c]^n)}$$

wherein $CM_{Lim}^{0.1}$=the lower limiting value of $CM^{0.1}$, i.e. the asymptotic $CM^{0.1}$ value with increasing levels of dispersant at high concentration; and $pH_c$=the critical pH which is approximately the mid-point of the straight line portion of the curve and n=the power law factor associated with the steepness of the straight line portion of the curve.

Figure 2:
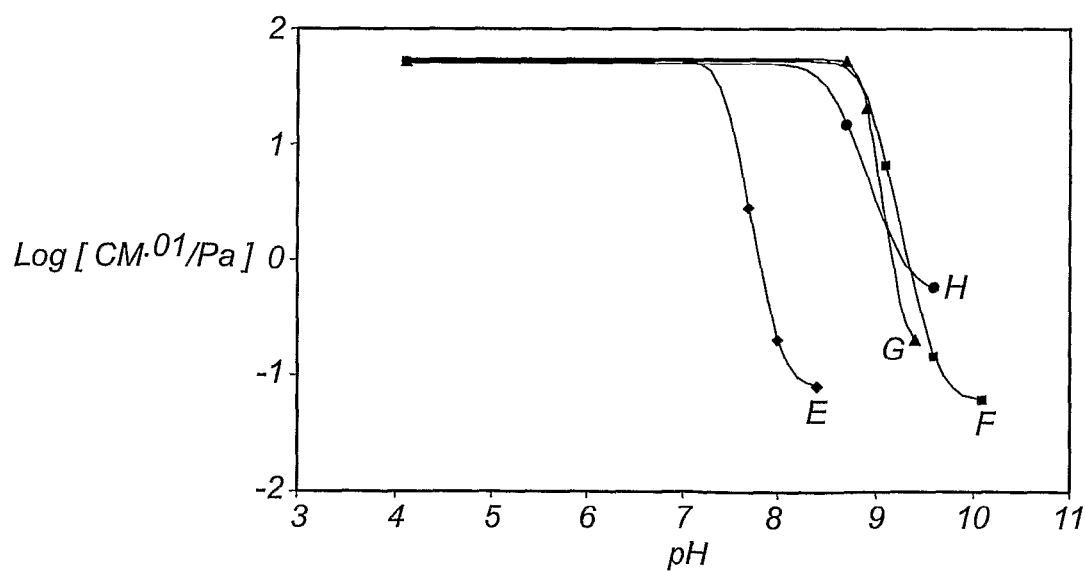
FIG. 2 shows the rheological data of a dispersant of the invention I-1 a (Curve E) and comparative basic dispersants (Curves F to H) as a function of the pH of the system.

In FIG. 2 the actual data are presented as points and the solid lines are the least squares fit to the data using the above formula together with 'solver' in Microsoft Excel. Although the fitting is only to 4 data points in most of the cases, all data fit to within 0.4%. The purpose of the model is help the eye sense the sigmoid nature of the curves.

Curve E represents the data of the dispersant for use in the invention I-1a (Examples 15-17) plus the control system (Example 1).

Curve F represents the data obtained with dispersant C1, i.e. sodium hydroxide (Examples 2-4), plus the control system (Example 1).

Curve G represents the data obtained with dispersant C3, i.e. dimethylaminoethanol—representing an anchor group chemistry of the invention (Examples 7-9), plus the control system (Example 1).

Curve H represents the data obtained with dispersant C2, i.e. N-methylglucamine, which represents a hydrophilic weak base (Examples 5-6), plus the control system (Example 1).

The fitting parameters for the solid curve are presented in Table 3.

TABLE 3

| Curve | $CM_{NoDisp}^{0.1}$/Pa | $CM_{Lim}^{0.1}$/Pa | $pH_c$ | n (power law) |
|---|---|---|---|---|
| E | 52.72 | 0.0801 | 7.433 | 81.88 |
| F | 52.78 | 0.0611 | 8.891 | 83.25 |
| G | 54.71 | 0.1688 | 8.867 | 125.8 |
| H | 50.97 | 0.5063 | 8.570 | 57.96 |

FIG. 2 together with the associated data in Table 3 shows another way of clearly distinguishing the difference between a dispersant for use in the invention and dispersants based on simple bases, whether inorganic or organic. Hence this approach provides both a simple and useful way of portraying the average pH differential at equivalent fluidity. In these terms the inorganic and organic bases behave very similarly in term of their impact on the system pH as a function $CM^{0.1}$, which is aptly shown by the closeness of their critical pH values ($pH_c$) which are virtually the same. The gap between the straight-line portions of the curve of the system, Curve E, representing a dispersant for use in the invention, and the curves of the simple base systems (Curves F, G, & H) is well represented by the difference in $pH_c$. Hence there is a 1.2 to 1.5 pH unit differential between the dispersant for use in the invention and the simple base dispersants, showing that the simple base systems need to increase the pH by this amount to achieve equivalent fluidity.

Hence when both the materials of comparison and those of the invention generate the sigmoid relationship depicted in FIG. 2, the materials of the invention can be differentiated usefully by both the $pH_c$ and $RelCM_{pH8}^{0.1}$ parameters. To establish such parameters it is clearly necessary to measure $CM^{0.1}$ as a function of pH over a suitable range of concentrations. Even if materials of the invention do not follow a simple sigmoid curve, they can still be differentiated by the $RelCM_{pH8}^{0.1}$ parameter, due to the effect of their basic nature on the pH of the system, which will cause the pH to increase with increasing concentration. For comparison, the $pH_c$ and $RelCM_{pH8}^{0.1}$ data resulting from Examples 15-17 are recorded in Table 4, together with the corresponding data from other examples of the invention and the comparative materials of a basic nature, C1, C2, C3 and C9.

The examples of the invention, which follow hereinafter, consist of generating rheological and pH data over a small range of dispersant concentrations such that data like those depicted in FIG. 2 could be produced and analysed according to the methods described above. The net objective therefore was to characterize the performance of the dispersants in fumed silica dispersions relative to any comparative materials by the reduction in $CM^{0.1}$ at pH 8 relative to the initial $CM^{0.1}$ value at zero additive ($RelCM_{pH8}^{0.1}$) and/or the critical pH parameter ($pH_c$).

FURTHER EXAMPLES OF THE INVENTION

Example 18

Control+Dispersant of the Invention I-2a

A small series of aqueous dispersions of Aerosil™200 was made up in the same way as the control system described in Example 1, with the exception that in each case an aqueous solution of dispersant I-2a was used in place of the water. The concentration of I-2a was varied across the series over the following range: 0, 2.0 and 5.0% w/w. The rheology of each system was measured following the protocol outlined in Example 1.

The system containing 2% w/w I-2a formed a thick uniform gel of pH 6.8, which gave a very high value of the complex modulus parameter, i.e. the $CM^{0.1}$ value was 20.4 times that of the parent silica dispersion with zero additive. Hence this dispersant was not effective at this concentration. However, the system containing 5% w/w I-2a formed a very fluid system of pH 8 with a very low complex modulus parameter ($CM^{0.1}$=0.065 Pa), which translates to a very low relative complex modulus at pH 8 ($RelCM_{pH8}^{0.1}$=0.0018). Hence dispersant I-2a is very effective at this concentration. Owing to the non-sigmoid relationship between $CM^{0.1}$ and pH with this particular dispersant, a $pH_c$ value cannot be determined as specified above.

Although the $pH_c$ parameter is unavailable to define the difference in performance between this example of the invention and the comparative materials on a pH scale, this connotation of difference can be defined another way, for instance, by comparing the pH value of a comparison material at the same relative reduction in $CM^{0.1}$ as that given by this example at pH 8, i.e. 0.0018—its $RelCM_{pH8}^{0.1}$ value. If curve F in FIG. 2 is taken by way of example, which represents the comparative material C1 (sodium hydroxide), the pH has to be raised to 9.7 to produce a relative reduction in $CM^{0.1}$ of 0.0018, i.e. the pH has to be raised by 1.7 units with sodium hydroxide to match the performance of a compound for use in the present invention.

The parameters $RelCM_{pH8}^{0.1}$ and $pH_c$ (where applicable) relating to example of compounds for use in the invention and the comparative materials C1, C2, C3 and C9 are presented in Table 4 below for comparison.

Example 19

Control+Dispersant of the Invention I-5a

A small series of aqueous dispersions of Aerosil™200 was made up in the same way as the control system described in Example 1, with the exception that in each case an aqueous solution of dispersant I-5a was used in place of the water. The concentration of I-2a was varied across the series over the following range: 0, 1.0, 2.0, 3.0, 4.0, 5.0, 6.0, and 8.0% w/w. The rheology of each system was measured following the protocol outlined in Example 1.

All concentrations reduced the viscosity of system after exposure to high shear. The lowest concentration of 1% w/reduced the $CM^{0.1}$ parameter by a factor of 0.04 relative to the zero dispersant case: this was achieved at pH 6.7. On analysis, this resulted in a $pH_c$ value of ~5.6 and a $RelCM_{pH8}^{0.1}$ value of 0.00425. The $pH_c$ estimate suggests that the primary amino anchor group of I-5a is much more efficient at reducing the viscosity as a function of pH relative to I-1a and I-2a, which both possessed a dimethylamino anchor group. In the current example, the majority of the potential reduction in $CM^{0.1}$ was accomplished by pH 7, i.e. neutral pH. The $RelCM_{pH8}^{0.1}$ value is similar in scale to I-1a and I-2a suggesting that overall effectiveness in the reduction of complex modulus at low shear is approximately the same. The parameters $RelCM_{pH8}^{0.1}$ and $pH_c$ (where applicable) relating to example materials of the invention and other comparative materials of a basic nature, are presented in Table 4 for comparison.

TABLE 4

| Dispersant System | pHc (Units of pH) | ΔpH$_c$ wrt dispersant C1 i.e. pH$_c$(C1)-pH$_c$ | RelCM$_{pH8}^{0.1}$ |
|---|---|---|---|
| C1 (Ex. 2-4) | 8.89 | 0 | 0.9998 |
| C2 (Ex. 5-6) | 8.57 | 0.32 | 1.0000 |
| C3 (Ex. 7-9) | 8.87 | 0.02 | 0.9999 |
| C9 (Ex. 20) | N/A | N/A | 22.65 |
| I-1a (Ex 15-17) | 7.43 | 1.46 | 0.0039 |
| I-2a (Ex. 18) | N/A | ΔpH at relative reduction in CM$^{0.1}$ of 0.0018 = 1.7 (w.r.t dispersant C1) | 0.0018 |
| I-5a (Ex. 19) | 5.6 | 3.3 | 0.0041 |

FURTHER COMPARATIVE EXAMPLES

These examples relate to polymeric compounds having a structure similar to the dispersants for use in the invention but which fall outside the scope of invention.

Example 20

Control+Comparison Dispersant C9

It follows from the description of the structure of the dispersant of the invention that the polymer moiety needs to possess a low affinity for the particles to be stabilised. On this basis it was considered that polymers containing hydroxyl groups, such as polyvinylalcohols, which are known to interact strongly with silica surfaces, would be unsuitable as stabilising groups for the dispersant materials of the invention. To test this hypothesis, a suitable vinyl monomer containing hydroxyl groups was selected for the purpose of synthesising a hydroxylated polymer of similar structure to I-1a and I-2a: the monomer chosen was N-trihydroxymethylmethylacrylamide. Using this monomer, the comparative material C9 was synthesised in a similar manner to Examples A, B and C with a final structure as hereinbefore defined.

A small series of aqueous dispersions of Aerosil™200 was made up in the same way as the control system described in Example 1, with the exception that in each case an aqueous solution of dispersant C9 was used in place of the water. The concentration of C9 was varied across the series over the following range: 0, 3.0, 4.0, 5.0 and 6.0% w/w. The rheology of each system was measured following the protocol outlined in Example 1.

All the systems including the zero dispersant control formed gels, but those containing the dispersant C9 were much thicker than the control. All the systems containing the dispersant C9 gave relative values of $CM^{0.1}$ of about 20, i.e. the $CM^{0.1}$ was ~20 times higher than the zero dispersant system. Hence the dispersant C9 was ineffective for reducing the viscosity of the system and in fact was antagonistic in this respect. The actual relative values of $CM^{0.1}$ for the concentration series, 3.0, 4.0, 5.0, and 6.0% w/w, were 19.5 (pH 7.1), 23.4 (pH 7.6), 21.2 (pH 8.1) and 18.4 (pH 8.2) respectively, and consequently there was maximum antagonistic effect at 4% w/w C9. This data illustrates that, in the absence of steric hindrance, hydroxyl-containing monomers are unsuitable structural components for the polymeric moiety of the materials of the invention.

Owing to the non-sigmoid nature of the rheological data obtained with the C9 dispersant as a function of concentration, a $pH_c$ value could not be determined. However, a value for $RelCM_{pH8}^{0.1}$ could be determined due to the basic nature of the amino anchor group in its chemical structure and its consequent effect on pH (see data above). The value of $RelCM_{pH8}^{0.1}$ (which clearly lies between 4.0 and 5.0% w/w C9) was determined by interpolation to be 22.65. This value is recorded in Table 4 together with the corresponding data from compounds for use in the dispersants for use in the invention and comparative materials of a basic nature for the purpose of comparison.

Example 21

Control+Comparison Dispersant C10

It follows from the description of the structure of the dispersant of the invention that the anchor moiety needs to be basic in character to chemically attach to negatively charged oxide or hydroxide particulate systems. On this basis it was considered that simple salts of the materials of the invention, such as the corresponding amine hydrochlorides would be unsuitable as dispersants for such particulate systems, and as such to fall outside the scope of the invention. To confirm this, the hydrochloride of I-2a was used as a test case. This is readily available, as the hydrochloride is generally an intermediate in the synthetic route to the materials for use in the invention. Since I-2a was extremely effective at reducing viscosity at 5% w/w concentration, this concentration was selected for the C10 test case.

A dispersion of Aerosil™200 was made up in the same way as the control system described in Example 1, with the exception that an aqueous solution of the dispersant C10 was used in place of the water, such that the final concentration of C10 in the system was 5% w/w. The rheology of this system was measured following the protocol outlined in Example 1.

The system initially formed an extremely thick gel, which remained thick even after high shear. This led to high shear stresses in the oscillating rheological data, which only became accurately measurable at high shear stress, e.g. stresses of 40-50 Pa. With the materials of the invention the shear stresses after high shear never exceeded 4 Pa at their highest strain rate. This made it virtually impossible to make any meaningful comparison of data at a common shear stress. Hence it is clear that converting the basic materials of the invention to their amine-salt form completely destroyed their properties as a dispersant for a negatively charged oxide (hydroxide), such as silica.

Clearly comparative materials that are non-basic in nature such as the amine salts of the materials of the invention, tend to have little impact on pH. Hence they could only be compared on the basis of their effect on a rheological parameter, such as the complex modulus, at equivalent concentrations to the materials of the invention. A rough scale of the difference in performance between the materials of the invention and the amine-salt C10 can be attempted by comparing the complex modulus parameter at an intermediate value of shear stress, such as 3.6 Pa, coded $CM^{3.6}$. However, it should be pointed out that the values of $CM^{3.6}$ obtained for the amine-salt C10 are not accurate due to the extremely low values of strain at this shear stress (i.e. 0.000028), which is an order of magnitude below that normally accepted for measurements with the Bohlin CS50 rheometer. Nevertheless, the measurement probably provides the right order and hence a sense of the scale of the difference. Table 5 below shows the $CM^{3.6}$ data and relative $CM^{3.6}$ ($RelCM^{3.6}$) data with respect to the control system in Example 1.

TABLE 5

| Dispersion System | $CM^{3.6}/$ Pa | $RelCM^{3.6}$ |
|---|---|---|
| Control (Ex. 1) | 1.15 | 1.000 |
| 5% I-1a | 0.042 | 0.037 |
| 5% I-2a | 0.034 | 0.029 |
| 5% 1-5a | 0.060 | 0.052 |
| 5% C9 | 52.6 | 45.8 |
| 5% C10 | 100,000 | 87,000 |

The data in Table 5 confirms that the benefits of the compounds for use in the invention are still operating at higher shear stress, producing a lower viscosity system than the control. The data also confirm the antagonistic effect of C9 at the higher shear stress, wherein the polymer 'buoy' component of the C9 has hydroxyl groups that destabilise the system relative to the control with zero dispersant and the compounds for use in the invention. However, the main point that the conversion of a compound for use in the invention, such as I-2a, to its amine salt, C10, has a much worse impact on the system viscosity than hydroxyl groups on the polymeric 'buoy' component.

A check can be run on the scale of the effect with C10 insofar as an acceptably meaningful measurement of complex modulus can be made at the higher shear stress of around 34 Pa. Although such shear stresses were not attained in the systems containing the materials of the invention, such a high stress can be just attained in the control silica dispersion with no dispersant. The complex modulus at 34 Pa shear stress is coded, $CM^{34}$. The $CM^{34}$ and relative $CM^{34}$ ($RelCM^{34}$) data with respect to the control system from Example 1 are recorded in Table 6 below. The data confirm that converting a compound for use in the invention into its corresponding hydrochloride causes a severe increase in the viscosity of the system, an absolutely opposite effect to that obtained for use of the compounds of the invention.

TABLE 6

| Dispersion System | $CM^{34}/$ Pa | $RelCM^{34}$ |
|---|---|---|
| Control (Ex. 1) | 0.104 | 1.000 |
| 5% C10 | 94,392 | 905,700 |

The invention claimed is:

1. A coating composition containing negatively charged or chargeable solid particulates, the composition comprising one or more dispersants in association with an aqueous dispersing medium, the one or more dispersants each comprising a compound having an anchoring moiety linked to a polymeric hydrophilic moiety, the anchoring moiety containing at least one basic group and having an overall basicity and the polymeric hydrophilic moiety comprising a polyacrylamide or a polymethacrylamide and having a lower affinity for a surface of the particulates than the anchoring moiety; further wherein said compound has the formula (I):

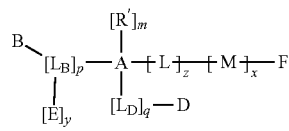

wherein
A is carbon or nitrogen;
R' is hydrogen or an alkyl, aryl or heterocyclic group and m is 1 when A is carbon and m is 0 when A is nitrogen;
B is a basic group;
each of D and E is independently hydrogen, an alkyl group, a basic group, an acid group, or an ester or amide of an acid group; and y is 0 or 1;
L, $L_B$ and $L_D$ are linking groups, which are the same or different, z is 1, p and q are each independently 0 or 1, and wherein L is selected from the group consisting of sulfur, alkylene, thioalkylene, ester, thioester, amide, thioamide, ketone, thioketone, ether, and thioether;
B, $L_B$, D, $L_D$ and L may combine with A to form one or more rings which may include one or more further heteroatoms selected from the group consisting of nitrogen, oxygen and sulfur;
each M is a monomer unit, which may be the same or different, comprising an acrylamide or methacrylamide; and x is 10-200; and
F is hydrogen or a halogen atom, an alkyl group, a thiol, a neutral thioether, an ether, an ester, or an alkyl- or aryl-sulfonate group;
with the proviso that the number of basic groups in the anchoring moiety is greater than the number of any acid groups therein.

2. A composition as claimed in claim 1, wherein the negatively charged or chargeable solid particulates are selected from the group consisting of metallic oxides, non-metallic oxides, hydroxides, ceramics, metals, and latexes.

3. A composition as claimed in claim 2, wherein the solid particulates are selected from the group consisting of $SiO_2$, $TiO_2$, $TeO_2$, $H_2MoO_4$, $SnO_2$, $ZrO_2$ and $Co_3O_4$.

4. A composition as claimed in claim 1, wherein the negatively charged or chargeable solid particulates have a particle size from 50 nm to 1 micrometer.

5. A composition as claimed in claim 1, wherein the negatively charged or chargeable solid particulates in the composition is a volume fraction of solids of about 0.2 to about 0.5.

6. A composition as claimed in claim 1, wherein the weight ratio of the dispersant to the negatively charged or chargeable solid particulates is 50:1000 to 500:1000.

7. A composition as claimed in claim 1, wherein there is also present a binder in the composition.

8. A method of coating a substrate comprising the steps of
    (a) providing a coating composition of claim 1;
    (b) applying the coating composition to the substrate to form a coating thereon; and
    (c) drying the resultant coating.

9. A coating composition as claimed in claim 1, wherein each basic group of the anchoring moiety of the compound is independently selected from the group consisting of an amine, nitrogen-containing heterocycle, which may contain one or more other heterocyclic atoms selected from the group consisting of nitrogen, oxygen and sulfur, and the hydroxide of a quaternary ammonium or pyridinium salt.

10. A coating composition as claimed in claim 9, wherein each basic group is an amine, dimethylamine, diethylamine, piperidine, piperazine, thiomorpholine, morpholine, benzimidazole, benzopyrrolidine, pyridine or pyrazole group.

11. A coating composition as claimed in claim 10, wherein each basic group is an unsubstituted amine or a N,N-dimethylamine group.

12. A coating composition as claimed in claim 1, wherein A is carbon and R' is hydrogen or a methyl group.

13. A coating composition as claimed in claim 1, wherein B is an amine, dimethylamine, or diethylamine group.

14. A coating composition as claimed in claim 1, wherein D is hydrogen or a dimethylamine or diethylamine group.

15. A coating composition as claimed in claim 1, wherein F is hydrogen.

16. A coating composition as claimed in claim 1, wherein x is 15-35.

17. A coating composition as claimed in claim 1, wherein z is 1 and L is sulfur.

18. A coating composition as claimed in claim 1, wherein the solid particulates are inorganic solid particulates having an isoelectric point below a pH of 5.8.

19. A coating composition as claimed in claim 1, wherein the dispersant has the structure

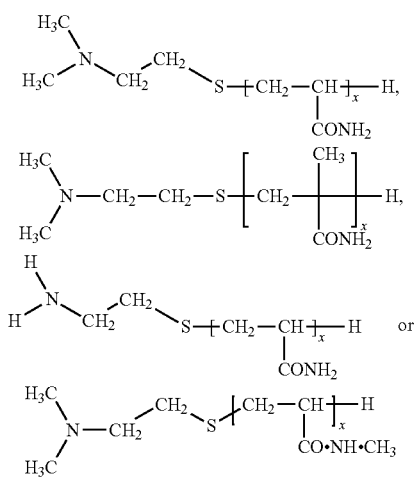

wherein x is from 15-35.

* * * * *